(No Model.)

F. A. LOEBLE.
RACK FOR BEER.

No. 534,479. Patented Feb. 19, 1895.

WITNESSES:
P. H. Nagle.
L. Douville.

INVENTOR
Frederick Albert Loeble,
BY John A. Wiedersheim
ATTORNEY.

UNITED STATES PATENT OFFICE.

FRIEDERICH ALBERT LOEBLE, OF PHILADELPHIA, PENNSYLVANIA.

RACK FOR BEER.

SPECIFICATION forming part of Letters Patent No. 534,479, dated February 19, 1895.

Application filed February 6, 1894. Serial No. 499,263. (No model.)

*To all whom it may concern:*

Be it known that I, FRIEDERICH ALBERT LOEBLE, a citizen of the United States, residing in the city and county of Philadelphia, State of Pennsylvania, have invented a new and useful Improvement in Racks for Beer, which improvement is fully set forth in the following specification and accompanying drawings.

My invention consists of a beer rack constructed as hereinafter set forth and claimed.

It also consists of the arrangement of parts as hereinafter set forth.

Figure 1:
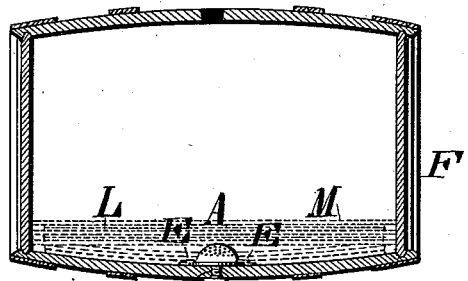
Figure 2:
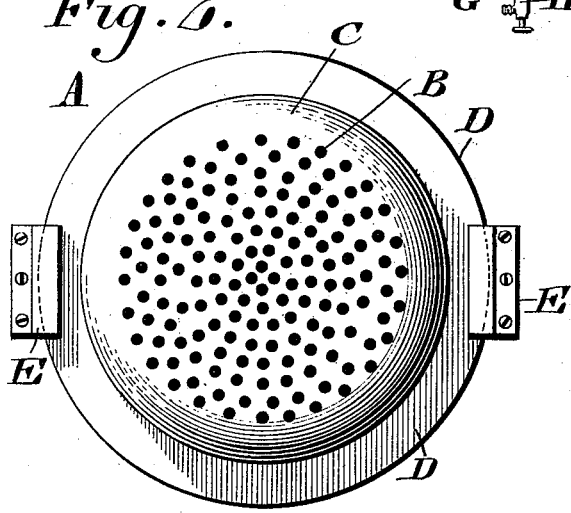
Figure 3:
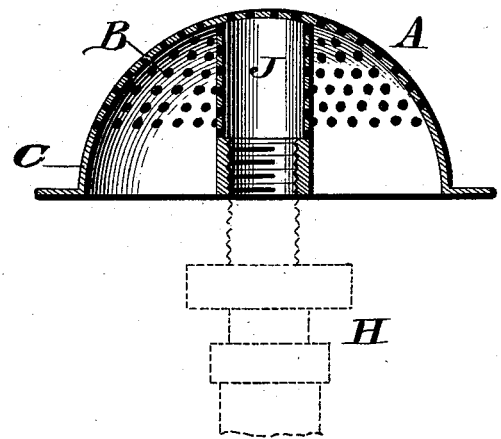

Figure 1 represents a side elevation of a beer rack embodying my invention, the same being on a reduced scale, and shown in connection with a barrel or vat. Fig. 2 represents a top or plan view on an enlarged scale. Fig. 3 represents a section of the strainer, showing the tube in the body of the same.

Similar letters of reference indicate corresponding parts in the several figures.

Referring to the drawings: A designates a strainer consisting of a body which is preferably of hemispherical form, partly perforated or foraminous at top, as at B, and imperforated at the bottom portion C.

D designates the peripheral rim of the body, the same being adapted to be removably fitted under the ears E, which latter are secured to the inner wall of the barrel or vat F, on opposite sides of the opening G therein, said opening being adapted to receive the end of the discharging faucet H, access being had to the vat in any suitable manner, in order to locate the ears and strainer, said ears preventing improper displacement of the latter. Within the body is a perforated tube J, which serves to sustain said body, and is threaded so that the faucet may be screwed to the same.

It will be seen that the beer may be readily strained in its passage through the body to the faucet, while the sediment in the vat remains therein, owing to the imperforate part C of the body, at the bottom thereof, it being also noticed that the vat is so disposed on its side, and will be so supported that the strainer occupies the lowest part of the vat, so that almost the entire quantity of the beer therein may be withdrawn, thus avoiding the reworking of the beer that would otherwise remain.

When the strainer is applied to one of the heads of the vat, the draining of the latter is not accomplished to the same extent as that by the location of the same in Fig. 1.

Having thus described my invention, what I claim as new, and desire to secure by Letters Patent, is—

1. A strainer consisting of a body of hemispherical form provided with a flanged base, and having a perforated top and an imperforated lower portion, and a tube within said body supporting the same, said tube having a perforated upper portion and an imperforate lower portion, said parts being combined substantially as described.

2. The strainer A having a perforated top and an imperforate lower portion, the tube J within said strainer and supporting the same, said tube having a perforate upper and an imperforate lower portion, and an interiorly screw-threaded lower end, said parts being combined substantially as described.

FRIEDERICH ALBERT LOEBLE.

Witnesses.
JOHN A. WIEDERSHEIM,
A. P. JENNINGS.